United States Patent
Ratcliffe et al.

(10) Patent No.: US 11,042,865 B2
(45) Date of Patent: *Jun. 22, 2021

(54) WEB PAGE ACTION GUIDANCE SYSTEM

(71) Applicant: Truist Bank, Charlotte, NC (US)

(72) Inventors: Lee Ratcliffe, Garner, NC (US); Vicki Givens, Wilson, NC (US); Deborah Faulkner, Rolesville, NC (US); Dan Mauney, Cary, NC (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,218

(22) Filed: Jun. 25, 2020

(65) Prior Publication Data
US 2020/0327528 A1    Oct. 15, 2020

Related U.S. Application Data

(63) Continuation of application No. 14/674,507, filed on Mar. 31, 2015, now Pat. No. 10,726,410.

(60) Provisional application No. 61/972,656, filed on Mar. 31, 2014.

(51) Int. Cl.
*G06Q 20/22* (2012.01)
*G06Q 20/10* (2012.01)

(52) U.S. Cl.
CPC ......... *G06Q 20/227* (2013.01); *G06Q 20/108* (2013.01)

(58) Field of Classification Search
CPC ... G06F 3/04842; G06F 3/0481; H04L 67/02; G06Q 20/108; G06Q 20/227
See application file for complete search history.

(56) References Cited

U.S. PATENT DOCUMENTS

| 5,903,881 | A | 5/1999 | Schrader et al. |
| 5,920,848 | A | 7/1999 | Schutzer et al. |
| 5,963,925 | A | 10/1999 | Kolling et al. |
| 7,630,937 | B1 | 12/2009 | Mo et al. |
| 7,865,432 | B2 | 1/2011 | Doran et al. |

(Continued)

OTHER PUBLICATIONS

"Data Driven Digital™ Banking Services", http://www.d3banking.com/features, May 4, 2013, 1 page.

(Continued)

*Primary Examiner* — Anil K Bhargava
(74) *Attorney, Agent, or Firm* — Kilpatrick Townsend & Stockton LLP

(57) ABSTRACT

A web server device is configured for communicating with a user device over a network via a web page. The web server device can receive an indication from the user device and can determine an action indicated by the user device among multiple actions that include transfer money, bill payment, direct deposit, person-to-person payment, and wire transfer. The web server device can determine the action indicated by the user device among the multiple actions by identifying a type of action solely from an identification of a recipient received from the user device and using stored data that includes associations of types of actions with a plurality of recipients. The web server can generate information for a user interface that is displayable by the user device for guiding the user via the web page to input information needed for the action determined from the multiple actions.

20 Claims, 20 Drawing Sheets

(56) References Cited

U.S. PATENT DOCUMENTS

| | | |
|---|---|---|
| 7,933,834 B2 | 4/2011 | Kumar et al. |
| 8,346,664 B1 | 1/2013 | Klieman et al. |
| 8,401,938 B1 | 3/2013 | Chapman et al. |
| 8,423,444 B1 | 4/2013 | Mackrell et al. |
| 8,560,447 B1 | 10/2013 | Hinghole et al. |
| 8,626,659 B1 | 1/2014 | Bowman et al. |
| 8,688,557 B2 | 4/2014 | Rose et al. |
| 8,924,393 B1 | 12/2014 | Channakeshava |
| 8,965,798 B1 | 2/2015 | Mackrell et al. |
| 9,123,072 B2 | 9/2015 | Ketchel, III |
| 9,165,291 B1 | 10/2015 | Andersen et al. |
| 9,569,074 B2 | 2/2017 | Thomas |
| 9,965,808 B1 | 5/2018 | Kunz et al. |
| 2002/0016769 A1 | 2/2002 | Barbara et al. |
| 2005/0076297 A1 | 4/2005 | Tanaka et al. |
| 2005/0091072 A1 | 4/2005 | Dunn et al. |
| 2006/0247966 A1 | 11/2006 | Law |
| 2007/0136682 A1 | 6/2007 | Stienhans |
| 2007/0266335 A1 | 11/2007 | Zielinski et al. |
| 2008/0126310 A1 | 5/2008 | Xu |
| 2008/0242274 A1 | 10/2008 | Swanburg et al. |
| 2009/0106118 A1* | 4/2009 | Pelegero .......... G06Q 20/40 705/26.1 |
| 2009/0204538 A1 | 8/2009 | Ley et al. |
| 2009/0222364 A1 | 9/2009 | McGlynn et al. |
| 2009/0271287 A1 | 10/2009 | Halpern |
| 2009/0303676 A1 | 12/2009 | Behar et al. |
| 2010/0114764 A1 | 5/2010 | Cataline et al. |
| 2010/0306091 A1* | 12/2010 | Homer .......... G06Q 30/04 705/34 |
| 2011/0213665 A1 | 9/2011 | Joa et al. |
| 2012/0116973 A1 | 5/2012 | Klein et al. |
| 2012/0221420 A1 | 8/2012 | Ross |
| 2012/0267432 A1 | 10/2012 | Kuttuva |
| 2013/0018785 A1* | 1/2013 | Dolphin .......... G06Q 20/3223 705/40 |
| 2013/0332354 A1 | 12/2013 | Rhee et al. |
| 2014/0172693 A1 | 6/2014 | Kanjlia et al. |
| 2014/0172695 A1 | 6/2014 | Kanjlia et al. |
| 2014/0181193 A1 | 6/2014 | Narasimhan et al. |
| 2014/0289640 A1 | 9/2014 | Poornachandran et al. |
| 2015/0019413 A1 | 1/2015 | Lazarus |
| 2015/0135067 A1* | 5/2015 | Ellis .......... G06F 16/9577 715/273 |
| 2015/0135607 A1 | 5/2015 | Ferrari |
| 2015/0248725 A1 | 9/2015 | Holtzman et al. |
| 2015/0277712 A1 | 10/2015 | Ratcliffe et al. |

OTHER PUBLICATIONS

U.S. Appl. No. 14/674,507, "Advisory Action", dated Jun. 7, 2018, 9 pages.

U.S. Appl. No. 14/674,507, "Final Office Action", dated Jan. 22, 2020, 18 pages.

U.S. Appl. No. 14/674,507, "Final Office Action", dated Mar. 28, 2018, 29 pages.

U.S. Appl. No. 14/674,507, "Non-Final Office Action", dated Aug. 16, 2019, 18 pages.

U.S. Appl. No. 14/674,507, "Non-Final Office Action", dated Jan. 15, 2019, 27 pages.

U.S. Appl. No. 14/674,507, "Non-Final Office Action", dated Jul. 26, 2017, 38 pages.

U.S. Appl. No. 14/674,507, "Notice of Allowance", dated Mar. 18, 2020, 14 pages.

Marcotte, "Responsive web design", CSS, Layout & Grids, Mobile/Multidevice, Responsive Design, Interaction Design, May 25, 2010, 8 pages.

* cited by examiner

Account Details

Checking 4153 / $1,714.81

As of Mar 24, 2015

Available Balance    $1,714.81

| | |
|---|---|
| Posted Balance | $1,714.81 |
| Interest Paid (YTD) | $0.03 |
| Interest Rate | 0.010% |
| Routing Number | ******1121 show |
| Account Number | ******4153 show |

Manage Debit Cards
Manage My Alerts
Buy Quicken

I Want to...
- Transfer Money
- Make Payments
- Order Checks or Deposit Slips
- Stop Payment on a Check
- Set up Direct Deposit (PDF)
- Dispute Debit Card Transaction
- Your Overdraft Options
- Go to Accounts Overview Print   Help

Transaction Details | Bill Pay Checks

View statements for this account   Export History

Select range: 30 days | 60 days | 90 days | 6 months

Advanced Search

| Date ▼ | Type | Check # | Description | Debit (-) | Credit (+) | Daily Posted Balance[1] |
|---|---|---|---|---|---|---|
| Pending 03/24/2015 | Debit | | Target #3344 | $100.00 | | |
| Pending 03/24/2015 | Debit | | Harris Teeter #6540 | | $52.34 | |
| 03/18/2015 | Debit | | ONLINE PMT CAP ONE AUTO CKF102597015POS BB&T ONLINE PAYMENT | $50.00 | | $1,714.81 |
| 02/23/2015 | Interest | | INTEREST PAYMENT | | $0.01 | $1,764.81 |

604 → (Pending 03/24/2015 row)
602 → (03/18/2015 row)

Your Pending Transactions and Available Balance will be adjusted during our nightly processing cycle as activity is posted to your account.

Transactions are paid from your Available Balance at the time of posting consistent with payment guidelines in your Bank Service Agreement.

[1] Daily Posted Balance: The posted balance after nightly processing is completed. Please note that transactions are paid from your Available Balance consistent with our payment guidelines, and that the Available Balance may be different than your Daily Posted Balance. Important: The Daily Posted Balance does not reflect all pending transactions and fees and should not be used determine how overdraft fees were assessed.

Payments & Transfers  🖨 Print  ⊙ Help

Make a Payment

| I Want to | Make a Payment ∨ |
| | Single View / List View |

All fields are required except those marked (optional).

Send To: Type or Select Recipient ∨
From: Checking 41...|$1,764.80 ∨
Amount: $
Frequency: One Time ∨
Send On: 2/23/2015 📅
Memo: (optional)

More payments can be added on the review page. Select Review.

[ Review ]  [ Cancel ]

I Want to...

| Add a New Recipient | > | Manage Recipients | > |
| View Upcoming Payments & Transfers | > | View Completed Payments & Transfers | > |
| View Statements | > | View the Payments & Transfers Demo | > |

Upcoming Payments | Completed Payments

Next 30 days

| Send Date | From | To | Amount | | |
|---|---|---|---|---|---|
| 2/24/15 | Checking 4153 | Bank of America | $22.00 ↻ | Edit | Delete |
| | | Total from Checking 4153 | $22.00 | | |

View all Upcoming Payments          ↻ *Repeating*

Make a Payment

I Want to: Make a Payment

All fields are required except those marked (optional).

How fast do you need it there?
- Same Business Day (Wire Transfer)
- Next Business Day (ACH Payment)
- ● 2-5 Business Days (Standard Bill Pay)

Single View | List View

Send To: American Honda Finance Corp
Acct#...22234
Recipient Details

From: Select Account

Amount: $

Last payment $130.00 3/15/2014

Frequency: One Time

Send On: 03/24/2015

Deliver by 5/8/2014    Electronic Payment

902 — Electronic Payment
Funds are held on the *Send on* date and withdrawn on the *Deliver by* date, which is within two business days for recipients who accept electronic payments.

FIG. 9

Make a Payment

| | |
|---|---|
| I Want to | Make a Payment > |

All fields are required except those marked (optional).

How fast do you need it there?
- ○ Same Business Day (Wire Transfer)
- ○ Next Business Day (ACH Payment)
- ⦿ 2-5 Business Days (Standard Bill Pay)

Single View | List View >

| | |
|---|---|
| Send To | Thomas Concrete (Thomas Concrete) > |
| | Acct # ...51422 |
| | Recipient Details |
| From | ROC MAIN/$380.13 > |
| Amount | $ |
| | Last payment |
| Frequency | One Time |
| Send On | 03/24/2015 |
| | Deliver by 3/31/2015    Paper Check |
| Memo | |

Paper Check — 1002
For recipients who do not accept electronic payments. A paper check will be delivered by US Mail no later than 5 business days from the *Send on* date. Funds will be withdrawn after the recipient deposits the check. Payments funded from a pre-paid card are withdrawn on the *Send on* date.

Payments & Transfers

Print  Help

Make a Payment

I Want to [ Make a Payment ▽ ]

[ Single View ] [ List View ]

Pay one or more bills by entering the information below and then select Review.
☐ Show hidden recipient(s)                                                Show/Hide Recipients

| Recipient | Pay From | Payment Amount | Send On |
|---|---|---|---|
| Bank of America (Bank of America) ...9573 | Checking 4153 Available $1,764.80 | $ Last Payment 09/04/2012 $57.11 Add Memo | 02/23/2015 📅 Deliver by 2/25/2015 Make Repeating |
| Capital One Auto Finance (Honda Civic 2012) ...06351 | Checking 4153 Available $1,764.80 | $ Last Payment 11/10/2014 $269.06 Add Memo | 02/23/2015 📅 Deliver by 2/25/2015 Make Repeating |
| Gun Tests (Gun Tests) ...62065 | Checking 4153 Available $1,764.80 | $ Add Memo | 02/23/2015 📅 Deliver by 3/2/2015 Make Repeating |
| The Moody Church (Dr Lutzer) ...ation | Checking 4153 Available $1,764.80 | $ Last Payment 08/04/2014 $120.00 Add Memo | 02/23/2015 📅 Deliver by 3/2/2015 Make Repeating |
| Truth Network (The Truth) | Checking 4153 Available $1,764.80 | $ Last Payment 11/10/2014 $130.00 Add Memo | 02/23/2015 📅 Deliver by 3/2/2015 Make Repeating |

[ Review ] [ Cancel ]

I Want to... — 1200

Add a New Recipient
Manage Recipient
View Upcoming Payments & Transfers
View Completed Payments & Transfers
View the Payments & Transfers Demo

Upcoming Payments — 1202

Next 30 days

↻ Bank of America (Bank of America)  2/24/15  $22.00

Total Checking 4153  $22.00

View all Upcoming Payments

Payments & Transfers

Please Review

Review your payments and click Submit.

Important: Payments submitted after 7 pm ET will be automatically adjusted to the next business day.

| Send To | From | Amount | Frequency | Send On | Memo | |
|---|---|---|---|---|---|---|
| Bank of America | Checking 4153 | $22.00 | One Time | 2/23/2015 Deliver by: 2/25/2015 | extra payment | Remove |
| Capital One Auto Finance (Honda Civic 2012) | Checking 4153 | $120.00 | One Time | 2/23/2015 Deliver by: 2/25/2015 | my vehicle payment | Remove |
| The Moody Church (Dr Lutzer) | Checking 4153 | $55.00 | One Time | 2/23/2015 Deliver by: 3/02/2015 | | Remove |
| Total from Checking 4153 | $197.00 | | | | | |

[Back]  [Submit]  [Cancel]

🖨 Print   ⊙ Help

FIG. 13

Payments & Transfers

🖨 Print  ⊙ Help

▼ Transaction request successful. When does money leave my account?

| Send To | From | Amount | Frequency | Send On | Memo | Reference Number | | |
|---|---|---|---|---|---|---|---|---|
| Bank of America | Checking 4153/$1,764.80 | $22.00 | One Time | 2/23/2015 Deliver by: 2/25/2015 | extra payment | 0000000134 | Edit | Delete |
| Capital One Auto Finance (Honda Civic 2012) | Checking 4153/$1,764.80 | $120.00 | One Time | 2/23/2015 Deliver by: 2/25/2015 | my vehicle payment | 0000000135 | Edit | Delete |
| The Moody Church (Dr Lutzer) | Checking 4153/$1,764.80 | $55.00 | One Time | 2/23/2015 Deliver by: 3/02/2015 | | 0000000136 | Edit | Delete |
| Total from Checking 4153 | | $197.00 | | | | | | |

Suggested Next Steps

Go to Payments & Transfers
Go to Upcoming Payments & Transfers
Go to Completed Payments & Transfers
Go to Accounts Overview Expecting a tax refund?
Be smart and save.
▲ BB&T eSavings

BB&T | Online Banking | Inbox ⌄ | Log off

Accounts ⌄  Payments & Transfers ⌄  Plan & Analyze ⌄  Customer Service ⌄

Print  Help

— 1600

Payments & Transfers

Make a Payment

| I Want to | Make a Payment ⌄ |
| --- | --- |
| | Single View · List View |

All fields are required except those marked (optional).

| Send To | Type or Select Recipient ⌄ |
| --- | --- |
| From | Regular Che.../$4,854.98 ⌄ |
| Amount | $ |
| Frequency | One Time ⌄ |
| Send On | 02/24/2015 |
| Memo | |

(optional)
More payments can be added on the review page.
Select Review.

[ Review ]   [ Cancel ]

I Want to...

| Add a New Recipient | ⌄ | Manage Recipients |
| --- | --- | --- |
| View Upcoming Payments & Transfers | ⌄ | View Completed Payments & Transfers |
| View Statements | ⌄ | View the Payments & Transfers Demo |

Upcoming Payments | Completed Payments

Next 30 Days

| Send Date | From | To | Amount | | |
| --- | --- | --- | --- | --- | --- |
| 2/24/15 | Regular Checking | Honda | $200.00 | Edit | Delete |
| 2/25/15 | Regular Checking | Autos | $0.01 | Edit | Delete |
| 2/25/15 | Regular Checking | Alltel | $0.03 ↻ | Edit | Delete |
| 2/26/15 | Regular Checking | Alltel | $0.02 ↻ | Edit | Delete |
| 2/27/15 | Regular Checking | AmTrust Bank | $3.00 | Edit | Delete |
| 3/2/15 | Regular Checking | Verizon | $0.79 ↻ | Edit | Delete |
| 3/2/15 | Regular Checking | AmTrust Bank | $0.04 ↻ | Edit | Delete |
| 3/3/15 | Regular Checking | Verizon | $0.02 ↻ | Edit | Delete |
| 3/4/15 | Regular Checking | Autos | $0.01 ↻ | Edit | Delete |

WEB PAGE ACTION GUIDANCE SYSTEM

CROSS-REFERENCE TO RELATED APPLICATIONS

This is a continuation of U.S. application Ser. No. 14/674,507, titled "Web Page Action Guidance System" to Ratcliffe et al., and filed Mar. 31, 2015 (allowed), which claims priority to U.S. Provisional Application Ser. No. 61/972,656, titled "Electronic and Networked Payments and Transfers" and filed on Mar. 31, 2014, the entirety of both of which are incorporated herein by reference.

TECHNICAL FIELD

This disclosure generally relates to communications networks and, more specifically (but not by way of limitation) to web-based communications systems to effectuate changes in separate systems.

BACKGROUND

Web-based systems, particularly ones that impact other systems, can require significant user knowledge for navigating various options and selections including in the web-based systems to effectuate the impact on other systems. Web-based systems may also involve terminology and processes specific to particular industries, rather than terminology accessible to a wide variety of potential users. Furthermore, web-based systems often have user interface designs per type of device (e.g., laptop or mobile device), but are not responsive to screen size per type of device. User interfaces often fail to guide users in providing the needed information quickly such that multiple exchanges of web pages and information are necessary, which involve increased bandwidth and system usage.

SUMMARY

In one example, a web server device is configured for communicating with a user device over a network via a web page. The web server device comprises a processing device and a non-transitory computer-readable medium. The non-transitory computer-readable medium comprises instructions that are executable by the processing device to cause the web server device to perform operations. The operations comprise receiving an indication from the user device. The operations also comprise determining an action indicated by the user device among multiple actions that include transfer money, bill payment, direct deposit, person-to-person payment, and wire transfer. The web server device is configured for determining the action indicated by the user device among the multiple actions by identifying a type of action solely from an identification of a recipient received from the user device and using stored data that includes associations of types of actions with a plurality of recipients, the recipient being a person, an entity, or an account of another user other than a user of the user device. The operations also comprise generating information for a user interface that is displayable by the user device for guiding the user via the web page to input information needed for the action determined from the multiple actions by (i) preventing the user from entering information on the user interface that is unnecessary for executing the action but that is usable for executing other actions of the multiple actions that is different than the action determined from the multiple actions and (ii) retaining on the user interface requests for information that is necessary for executing the action.

In another example, a method comprises receiving, by a web server device communicating with a user device over a network via a web page, an indication from the user device, the indication identifying a recipient. The method also comprises determining, by the web server device or a backend application server system communicating with the web server device, an action indicated by the user device among multiple actions by automatically identifying a type of action solely from an identification of the recipient received from the user device and using stored data that includes associations of types of actions with a plurality of recipients, the recipient being a person, an entity, or an account of another user other than a user of the user device, the multiple actions including transfer money, bill payment, direct deposit, person-to-person payment, and wire transfer. The method also comprises selecting, by the backend application server system communicatively coupled between the web server device and a plurality of database devices and between the web server device and an action implementation system, a database device among the plurality of database devices, and a data type to access, based on the action, the plurality of database devices having different data associated with a user identification for the user of the user device, and different data corresponding to different actions. The method also comprises generating, by the web server device, information for a user interface that is displayed by the user device for guiding the user via the web page to input information needed for the action determined from the multiple actions by (i) preventing the user from entering information on the user interface that is unnecessary for executing the action but that is usable for executing at least one other action of the multiple actions that is different than the action determined from the multiple actions and (ii) retaining on the user interface requests for information that is necessary for executing the action.

In another example, a non-transitory computer-readable medium comprises instructions that are executable by a processing device for performing operations. The operations comprise receiving an indication from a user device. The operations also comprise determining an action indicated by the user device among multiple actions that include transfer money, bill payment, direct deposit, person-to-person payment, and wire transfer. The operation of determining the action indicated by the user device among the multiple actions includes identifying a type of action solely from an identification of a recipient received from the user device and using stored data that includes associations of types of actions with a plurality of recipients, the recipient being a person, an entity, or an account of another user other than a user of the user device. The operations also comprise generating information for a user interface that is displayable by the user device for guiding the user via a web page to input information needed for the action determined from the multiple actions by (i) preventing the user from entering information on the user interface that is unnecessary for executing the action but that is usable for executing other actions of the multiple actions that is different than the action determined from the multiple actions and (ii) retaining on the user interface requests for information that is necessary for executing the action.

BRIEF DESCRIPTION OF THE DRAWINGS

FIG. 6 is a user interface of account details according to one example.

FIG. 7 is a user interface for initiating an action of payments via a single view according to one example.

FIG. 8 is a user interface for initiating an action of payments and transfers with selected options available depending on information received from a user, according to one example.

FIG. 9 is a user interface with information about electronic payment according to one example.

FIG. 10 is a user interface with information about a paper check according to one example.

FIG. 12A is a user interface for initiating an action of payments via a list view, according to one example.

FIG. 12B is a user interface, as shown in FIG. 12A, with certain entries in the list highlighted, according to one example.

FIG. 13 is a user interface for receiving verification of scheduled payments prior to submission, according to one example.

FIG. 14 is a user interface for confirming action on scheduled payments and transfers, according to one example.

FIG. 16 is a user interface as displayed on a user device that is a first type of user device, according to one example.

DETAILED DESCRIPTION

The present disclosure relates to networked, web-based systems for easily effectuating particular actions or changes, among multiple available actions, in separate systems easily. By way of one example, a system can provide for payments and transfers of funds electronically and in a networked manner. Certain examples provide a user interface that facilitates payments and transfers in a client-optimized, responsive design approach.

For example, based on extensive usability testing, a user interface is provided that is easy to use, and that implements processes and flows that are efficient and intuitive. Copy and field labels can be easily understandable (eliminating industry-specific speak), and the design style can be pleasing to the user. In some examples, users are guided through the user interface and are able to complete multiple, complex tasks while continuing to move forward in an overall flow. Users do not need to use the back arrow on common web processes. "Suggested Next Steps" and "I Want To" options can be conveniently located on each page of the user interface.

Examples of a user interface can be optimized for any screen size, desktop PC, tablet, or mobile phone, and can be touch-enabled. For example, the user interface can intelligently adapt to the device on which it is rendered. Information can be grouped into widget-like containers that may be expanded or collapsed based on user preference. The set preferences can be saved and can be displayed appropriately each time the user logs on. Large tables of information can be avoided to accommodate smaller screen sizes.

In some examples, a user may not be required to decide what type of action that the user wants to make first and then have to navigate to the appropriate tab to start the operation. Having each action type be associated with its own, static long form and required inputs (e.g., bill pay—clients must start the process by choosing from a list of payees organized in a list/table format) can be avoided.

A user interface according to certain examples can present clients with money movement options conveniently placed in one location. The simplified process of moving money can combine payment types, internal transfers, outside transfers, bill pay, ACH, Direct Deposit, and wire transfer, in one flow that is intuitively designed and guides the user through completing the task without leaving the flow. Users may not be required to learn new processes for different types of move money operations. Some examples may decrease page load times.

Figure 1:
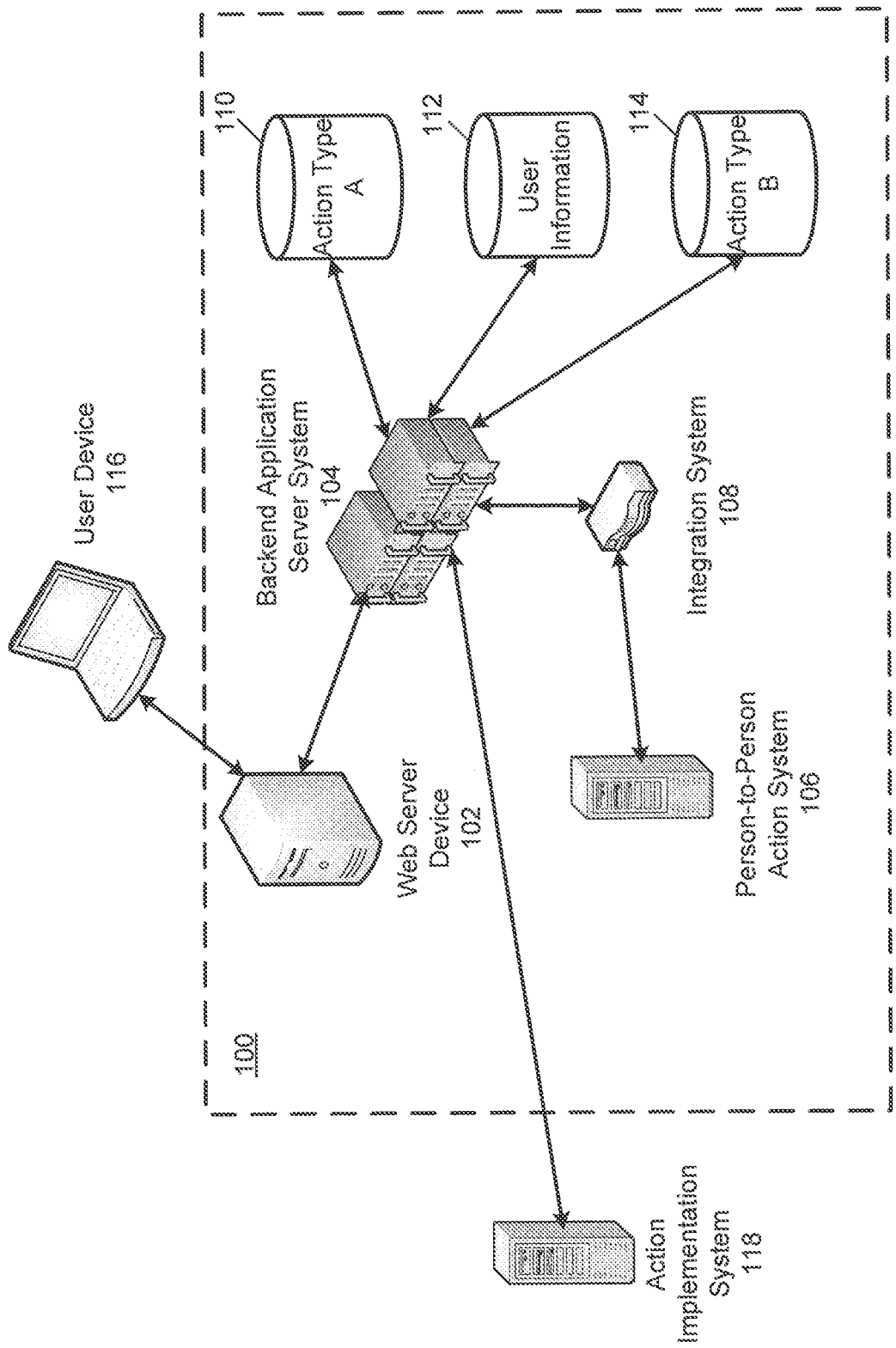
FIG. 1 depicts a schematic diagram of a system for managing implementation of an action according to one example.

Certain examples can be implemented in a networked and electronic system. FIG. 1 depicts an example of a networked and electronic system 100 in which various processes can be implemented using server devices and database devices. The system 100 includes a web server device 102, a backend application server system 104, a person-to-person action system 106 communicatively coupled to the backend application server system 104 through an integration system 108, and certain database devices communicatively coupled to the backend application server system 104. An example of the person-to-person action system 106 is a person-to-person payment system. The integration system 108 can format requests and commands for the person-to-person action system 106 so that the person-to-person action system 106 can effectuate an action through networked communication with other accounts, systems, and currencies. In some examples, the integration system 108 is separate from the system 100. The integration system 108 can create a layer of isolation between systems, such as if one or more of the systems is an external system, to reduce the complexity of replacing systems and to improve allowing other applications easy access to those systems.

The database devices include an action type A database device 110, a user information database device 112, and an action type B database device 114. The action type A database device 110 can include historical information associated with a user identification about activities previously performed by the user in connection with a certain action type—action type A. An example of an action type A database device 110 is a bill payment warehouse database device. The user information database device 112 can include user identifications associated with user account information and, in some example, user demographic information. The action type B database device 114 can include historical information associated with a user identification about activities previously performed by the user in connection with a certain action type—action type B. An example of an action type B database device 114 is a money transfer database device. In some examples, the database devices 110, 112, 114 are implemented as logical databases, such as virtual machines or devices, rather than on separate devices.

The web server device 102 can communicate over a network with a user device 116. The user device 116 may be a computing device, such as a laptop, mobile phone, desktop, personal digital assistant, tablet, etc., that can display content in a web browser or other interface. For example, the web server device 102 can generate user interfaces and provide the user interfaces to the user device 116 over the network. The web server device 102 can also receive requests and commands from the user device 116, and configure the user interfaces to be provided to the user device 116 in response to the requests and commands.

The backend application server system 104 can communicate with an action implementation system 118. The action implementation system 118 may be part of the system 100 or separate from the system 100. The action implementation system 118 can implement the action selected by the user and validated according to the other components of the system. An example of the action implementation system 118 is a payment and transfer system that can effectuate, through networked exchanges across various systems, the payment or transfer of funds between accounts, systems, and currency exchanges. The backend application server system 104 can exchange data and commands, electronically or optically, with database devices, the web server device 102 and the person-to-person action system 106 through the integration system 108.

Figure 2:
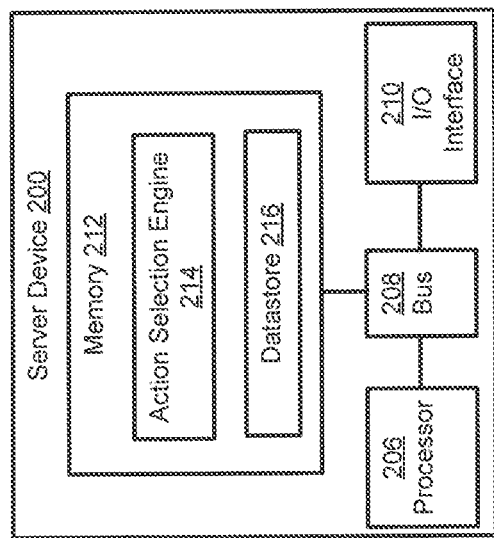
FIG. 2 depicts a block diagram of a server device usable in the system of FIG. 1 according to one example.

FIG. 2 depicts a block diagram of a server device 200 or system. One or more of the web server device 102, backend application server system 104, the person-to-person action system 106, and the integration system 108 of FIG. 1 may each include the type of components depicted in FIG. 2.

The server device 200 can include a processor 206, a memory 212, and a bus 208. The memory 212 includes a tangible, computer-readable memory on which code is stored. The processor 206 can execute code stored in the memory 212 by communication via the bus 208 to cause the server device 200 to perform actions. The server device 200 can include an input/output (I/O) interface 210 for communication with other components, such as a network, other server devices, and external systems. The server device 200 may be any device that can process data and execute code that is a set of instructions to perform actions. Examples of the server device 200 include a database server, a web server, desktop personal computer, a laptop personal computer, a handheld computing device, and a mobile device.

Examples of the processor 206 include a microprocessor, an application-specific integrated circuit (ASIC), a state machine, or other suitable processor. The processor 206 may include one processor or any number of processors. The processor 206 can access code stored in the memory 212 via the bus 208. The memory 212 may be any non-transitory, computer-readable medium configured for tangibly embodying code and can include electronic, magnetic, or optical devices. Examples of the memory 212 include random access memory (RAM), read-only memory (ROM), a floppy disk, compact disc, digital video device, magnetic disk, an ASIC, a solid state device, a configured processor, or other storage device.

Instructions can be stored in the memory 212 as executable code. The instructions can include processor-specific instructions generated by a compiler or an interpreter from code written in any suitable computer-programming language. The instructions can include an application, such as an action selection engine 214, that, when executed by the processor 206, can cause the server device 200 to generate a user interface or a series of user interfaces for intuitively guiding a user through selecting an action, gathering information from database devices to guide the user and validate the action, and executing the action by communicating with an external system. The memory 212 can also include a datastore 216 in which content and data can be stored.

Figure 3:
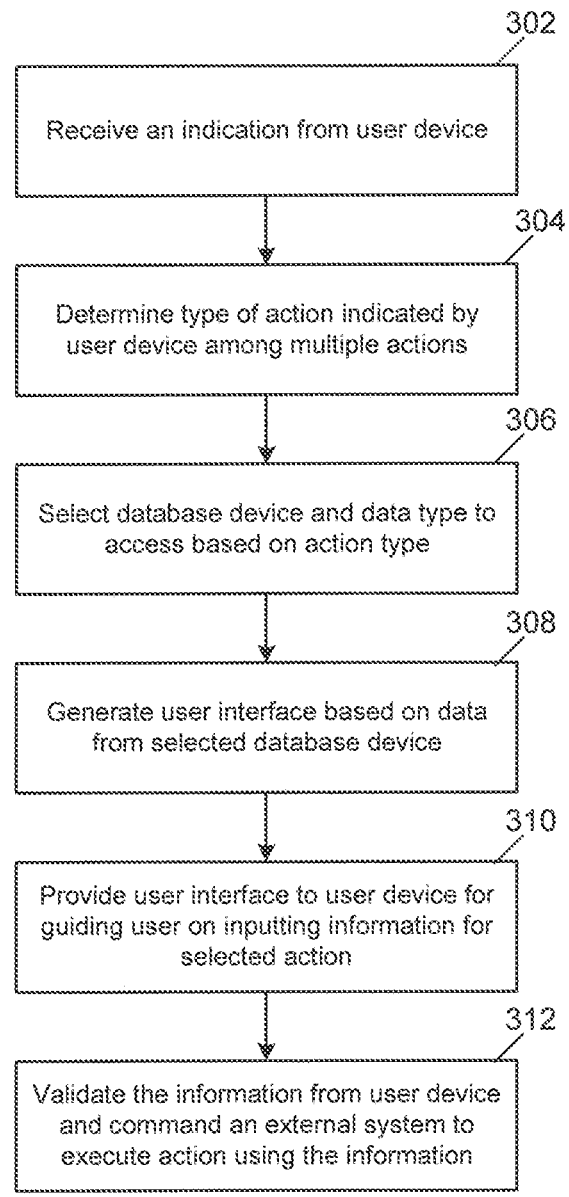
FIG. 3 is a flow chart of a process for guiding a user and executing an action via a web-based system according to one example.

FIG. 3 depicts a flow diagram of a process for guiding a user in selecting an action using a networked system. The process is described with respect to the system 100 shown in FIG. 1, but other implementations are possible.

In block 302, the web server device 102 receives an indication from the user device 116 via a network. The indication may be in the form of a command or other data transmitted electronically or optically from the user device 116 in response to user input. The indication can be received as an input in response to the presentation of a user interface that includes a web page configured to accept input and transmit the input to the web server device 102 over the network. The indication can indicate or suggest an action desired by the user to be executed. In some examples, the indication is about an action of a payment or transfer of funds.

In block 304, the type of action indicated by the user device 116 is determined. In some examples, the web server device 102 can determine the type of action indicated by the user device 116 by determining the type of input provided by the user to the user device 116. In other examples, the web server device 102 electronically or optically transmits the indication to the backend application server system 104, which determines the type of action indicated by the user device 116. Examples of types of requests can include a payment request, a transfer request, and a person-to-person payment request. The web server device 102 or the backend application server system 104 can determine the type of action based on an option presented on the web page and selected by the user. In other examples, the web server device 102 or the backend application server system 104 determines the types of action by detecting a series of commands received from the user device 116 matches a workflow of a particular type of action. The web server device 102 may determine the action automatically based on an identification of the recipient received from the user device. For example, if a recipient is a bank account, then the system can present information needed to make a transfer. If the recipient is a utility company, then the system presents information needed to make a bill payment.

In block 306, the backend application server system 104 selects a database device and data type to access based on the action type. For example, the backend application server system 104 can determine that the type of action being requested is of a type A and can access information associated with the user identification that is stored in action type A database device 110 by transmitting a digitized representation of a request to the action type A database device 110. The request can include the user identification and the type of information requested from the action type A database device 110. The backend application server system 104 can receive a response, electronically or optically, from the database device (in the example above, action type A database device 110) with the requested information and associate the information together in a packet that is provided to the web server device 102.

In block 308, the web server device 102 generates a user interface based on data from the selected database device and received from the backend application server system

104. The web server device 102 can generate a user interface for display by the user device 116 that shows different information (e.g., a branch among multiple branches) to the user based on the type of request and guide the user for input needed to complete an action on the request. In block 310, the web server device 102 provides the user interface to user device for guiding the user on inputting information for selected action. For example, the web server device 102 can generate a user interface for a branch that corresponds to the type of request and that guides the user into providing the information needed for that type of request. User interfaces for the multiple branches can use a common style, layout, and presentation, but guide users to input different types of information, depending on the type of request corresponding to the branch. For example, options that a user is authorized to select for a particular branch can be presented, but other options (e.g., options applicable to other types of requests) are not presented. The user interfaces may also allow the user to identify a new person or account for association with a payment or transfer. In some implementations, the user interface may include an option for the user to add additional bills, transfers, etc., and to bundle multiple bills, transfers, etc. together. The web server device 102 can receive the action-related information in response to the user providing information through a web page formulated to guide the user to input the necessary information. The web server device 102 can provide the action-related information to the backend application server system 104.

In block 312, the backend application server system 104 validates the information from the user device 116 and commands the action implementation system 118 to perform the action. The action may impact multiple external systems or only impact the system 100. Examples of an action include the movement of funds for payment or a transfer of funds. The backend application server system 104 can validate the information by comparing the types of information received from the user device 116 to the information necessary to command the action to be executed. In other examples, the backend application server system 104 accesses data in the database devices to confirm that that the information received from the user device 116 is consistent with data expected to be received from the user device 116. After initiating the action in response to the request by electronically or optically commanding the action implementation system 118 to execute the action, the web server device 102 can generate a user interface that confirms that the action has been initiated or completed.

Features Included in Some Implementations

Systems according to some examples can include an integrated use of tooltips and "lightbox" popups to provide help in context and keep the user in the flow of the user's task. "Upcoming and Completed Transfers or Payments" can be displayed at the time of making a transfer or payment to help users make decisions (e.g., Have I already paid my bill to Time Warner Cable? Did my transfer already go through? How much was my recent payment to my doctor?). Some systems may provide users with the ability to edit and delete payments and transfers from this view as well.

For selecting a recipient to pay, a combination of type-ahead/select menu elements can be provided to give the user the option of using either method. The type-ahead element can allow the user to begin typing while instantly filtering the list as the user types. This can be particularly helpful for users that have several bill pay recipients. Most other bill payment set-up forms show a long list of the user's recipients/billers on screen. The menu can allow the user to select only the one the user needs. This can eliminate on-screen clutter, keep the user focused on the individual task and mitigate mistakes. It can also be mobile-friendly, meaning the design can work in the same manner on a smartphone as it would on a desktop computer. The user does not need to re-learn how to use the payment and transfer forms if the user uses multiple devices to access the online banking website, an increasing trend.

Some systems can allow access to adding a new recipient at the time the user needs it, while making a payment. There can be multiple access points for this, from the "Send To" select menu or from the "I Want to" links. Some systems can allow access to adding an external transfer account (an account not with the financial institution that hosts, provides, or arranges to provide the interface) at the time the user needs it, while making a transfer. There can be multiple access points for this, from the "From" account select menu or from the "I Want to" links. For small business ACH and Wire clients, some systems can provide the ability to add new ACH and Wire recipients in the flow of making a payment. The form can expand to show appropriate fields if a new recipient option is requested.

Using a progressive disclosure design, some systems can provide content only when needed or requested. Examples include:
 a. When a recipient is selected, the recipient details, last payment date and amount, deliver by date and payment type can be displayed for that recipient.
 b. Also, the frequency options (no end date, number of payments) may not be displayed until an option other than "one-time" is chosen.
 c. For transfers, options for higher transfer limits or "next business day delivery" can be displayed if certain accounts are selected/user is eligible.

Some systems can provide the ability to view and edit the recipient details while making a payment. This can be helpful if a user notices their recipient's account number has changed or if the user needs to update the recipient's address, the user can accomplish this at the time of payment without needing to navigate away and returning. For making a payment, a custom calendar date picker design can provide a visual color-coded display to help users understand the different bill recipient types and delivery times. On the Verify/Review step, some systems can provide the ability to Edit or Remove payments or transfers "inline" instead of requiring to go back to the previous step.

For payments, multiple payments can be added and submitted all at one time (and pay from multiple accounts). Individual payments can "roll up" to a summary and a new payment form expands in the view to allow users to "stack up" as many payments as the user needs. When the form expands, it may also move to the top of the user's viewport (helpful for small screens/devices). Some systems provide the ability to edit or delete payments or future-dated transfers from the confirmation page.

For small business "make payments," some systems can combine all small business-related payment functions. Users have one place to go to make wires, ACH payments, direct deposits, bill payments, transfers. For small business, progressive disclosure design can help to step users through the process by asking "how fast" the user would like the payment to arrive. The user can choose same-day wire, next-day ACH payment or 2-5 business day bill payment.

Examples of Additional Features

The examples listed in this section apply to each operation for moving money in connection with a financial institution and through the use of user interfaces generated for display on web pages.

a. Each move money operation can begin with "I Want To" and the user can choose between "Make a Payment," "Transfer Money," or "Direct Deposit," to start the flow.
b. If a user selects "Make a Payment" the user can then be prompted to choose how fast the user needs the payment to execute—same-day wire transfer, next-day ACH, or 2-5 business day bill pay. This can eliminate the need for the user having to guess or research the varying processing deadline and settlement times for the payment types.
c. Fees that may apply based on the payment type can be shown within the flow.
d. Users can be asked to select a recipient. The user can select from a drop-down box or type-ahead feature that presents an alphabetically-arranged, abbreviated list of recipients, or the user can add a new recipient in line without ever leaving the flow. This can be a way to manage large lists of recipients.
e. Tool tips can be logically located throughout the payment flow in a hover-over or light-box design that retains the user in the payment flow while providing convenient access to instructions.
f. Error messages can be presented within the flow where the error occurs, and can be indicated with icons and contrasting boxes, clearly showing the user where the corrections are needed without having to start over, go back, or leave the flow.

Descriptive Examples of Screen Flow Options Available for Users

Examples of features that may be available to user in connection with an action, such as a move money operation, are described in this section. These are examples only. Deviations (e.g., leaving out certain features, modifying certain features, and adding additional features) within the scope of this disclosure are permissible.

Transfers:
a. User starts the "Move Money" flow.
b. Selects "Transfer" and the appropriate fields are presented to the user.
c. The user interface can prompt users to select the "From" account before the "To" account to provide an intuitive flow.
d. User can choose to fund the transfer from an account not associated with the financial institution providing the user interfaces, and can add that external account by completing a few simple tasks.
e. If user adds an external account and qualifies for next business day delivery, the user can be presented with another offer without leaving the transfer flow.
f. Field labeling can be dynamic based on the "Move Money" type and frequency
 i. If user chooses to make a single transfer, then the Date field is labeled "Send On"
 ii. If user chooses to make recurring transfers, then the Date field is labeled "Begin On"
g. "Upcoming and Completed Transfers" can be visible on the page while making the transfer
h. User can see a summary of the transfer when the user selects "Review," and can edit or cancel the transfer from the Review page.
i. User can receive a warning if the user edits or cancels the transfer before selecting "Complete," or if the user navigates away before selecting "Submit."

Bill Pay for Small Business or Other Types of Customers:
a. User starts the "Move Money" flow.
b. User selects "Make a Payment."
c. User is prompted with "How Fast Do I Need it There?"
 i. Same-day Wire, next-day ACH, 2-5 business day bill pay.
 ii. If client is not eligible or enrolled in the ACH/wire service the options can be disabled (e.g., radio button not selectable).
d. User is prompted to select a recipient.
 i. User can select from a drop down box or type ahead.
 ii. If recipient is selected, the user can receive summary information for the recipient in-line with selection.
 iii. User can edit recipient information in-line and can receive a confirmation after the edit is made.
e. Once the user selects or adds the recipient, an indicator can be displayed next to the send on/calendar pick if the payment is to be sent via electronic or paper check. If the recipient is "known" as a bill pay recipient (e.g., in a stored merchant directory), the payment can process electronically. If the recipient has not previously been paid by bill pay or an account number is not available, the payment can be a check by mail. Both payment methods can also have tool tips notifying the user when funds will be debited from the user's account.
f. When choosing the "Bill Pay" date, the user can be presented with a custom "Bill Pay" calendar that depicts the send/deliver by dates. The calendar can be optimized for various and different screen sizes. Also, if the user implements the calendar picker to select the "Send On" date, the days forward can be highlighted to reflect electronic or payment showing the client when the recipient should anticipate receiving the payment.
g. "Upcoming and Completed Bill Pay" payments can be visible on the page while making the payment.
h. User can see a summary of the "Bill Pay" when the user selects "Review," and the user can edit or cancel the "Bill Pay" from the summary page.
i. User can choose to "Add Another" bill pay payment and continue to stack multiple payments. Both single and multiple payments can be accommodated within this flow—the user can be provided the convenience of either way to pay. A total for each funding account can be displayed to the user on the summary page for the total amount of the "Bill Pay" payments.
j. User can receive a warning if the user edits or cancels the "Bill Pay" before selecting Submit. User can submit multiple "Bill Pay" payments at once and can see the total amount of the "Bill Pay" payments by account on the confirm page.

ACH:
a. User starts the "Move Money" flow.
b. User selects "Make a Payment."
c. User is prompted with "How Fast Do I Need it There?"
 i. Same-day Wire, Next-day ACH, 2-5 Business day Bill Pay.
 ii. If user is not eligible or enrolled in the ACH/Wire service the options are disabled (e.g., by having an unselectable radio button).
 iii. If user is eligible but not enrolled in the ACH/Wire service, the "Add ACH/Wire" button appears and, if selected, the user is taken to the "Business Services" page to start the enrollment.
 iv. If user is eligible and chooses "Next-day ACH," the different types of ACH payments can be presented with the appropriate fee.
d. User may select or add a recipient and is presented with summary information for the recipient to include ABA Routing and Account Numbers (visual confirmation).
e. The field name for the date can change dynamically to "Effective Date" (unique terminology for ACH payment, tool tip provided).

Direct Deposit:

a. User starts the "Move Money" flow.

b. User selects "Direct Deposit" (used to pay employees).

c. It can be presented in the "Move Money" flow as another "Move Money" task, unlike being grouped with different functions in the user interface.

d. Users can add employees to one or multiple constructed templates that can also be optimized for smaller screens.

e. Users can edit/delete employees from the templates and add or delete whole templates.

f. The "Direct Deposit" payments to each employee and the debit to the funding account can execute with one "Review/Complete" step within the flow.

Wire Transfer:

a. Users starts the "Move Money" flow.

b. User selects "Make a Payment."

c. User is prompted with "How Fast Do I Need it There?"

i. Same-day Wire, Next-day ACH, 2-5 Business day Bill Pay.

ii. If user is not eligible or enrolled in the ACH/Wire service, the options are disabled (e.g., radio button prevented from being selected).

iii. If user is eligible but not enrolled in the ACH/Wire service, the Add ACH/Wire button can appear and, if chosen, the user is taken to the "Business Services" page to begin the enrollment.

iv. If user is eligible and chooses "Same-day Wire," both Domestic and International wire transfer options can appear with the appropriate fee.

v. User can select and the fields can be dynamically presented based on unique requirements for each type of wire transfer.

vi. Tool tips can be instructive and help the user navigate through the wire flow with ease.

vii. For both types of wires, as a convenience, the user can be presented with the available balance for the account the user is using to fund the wire to ensure funds are available, without having to leave the "Move Money" flow.

In some systems, person-to-person (P2P) payments can be added to the "Move Money" flow. Multiple recipients can be combined into a single data table to allow for further simplification of the "Move Money" operation by reordering what is important to the user. Selecting the "Recipient" can be the first choice instead of choosing between a payment or a transfer.

Examples of User Interfaces

FIGS. 4-18B are examples of user interfaces that the web server device 102 may be designed to provide for display by the user device 116.

Figure 4:
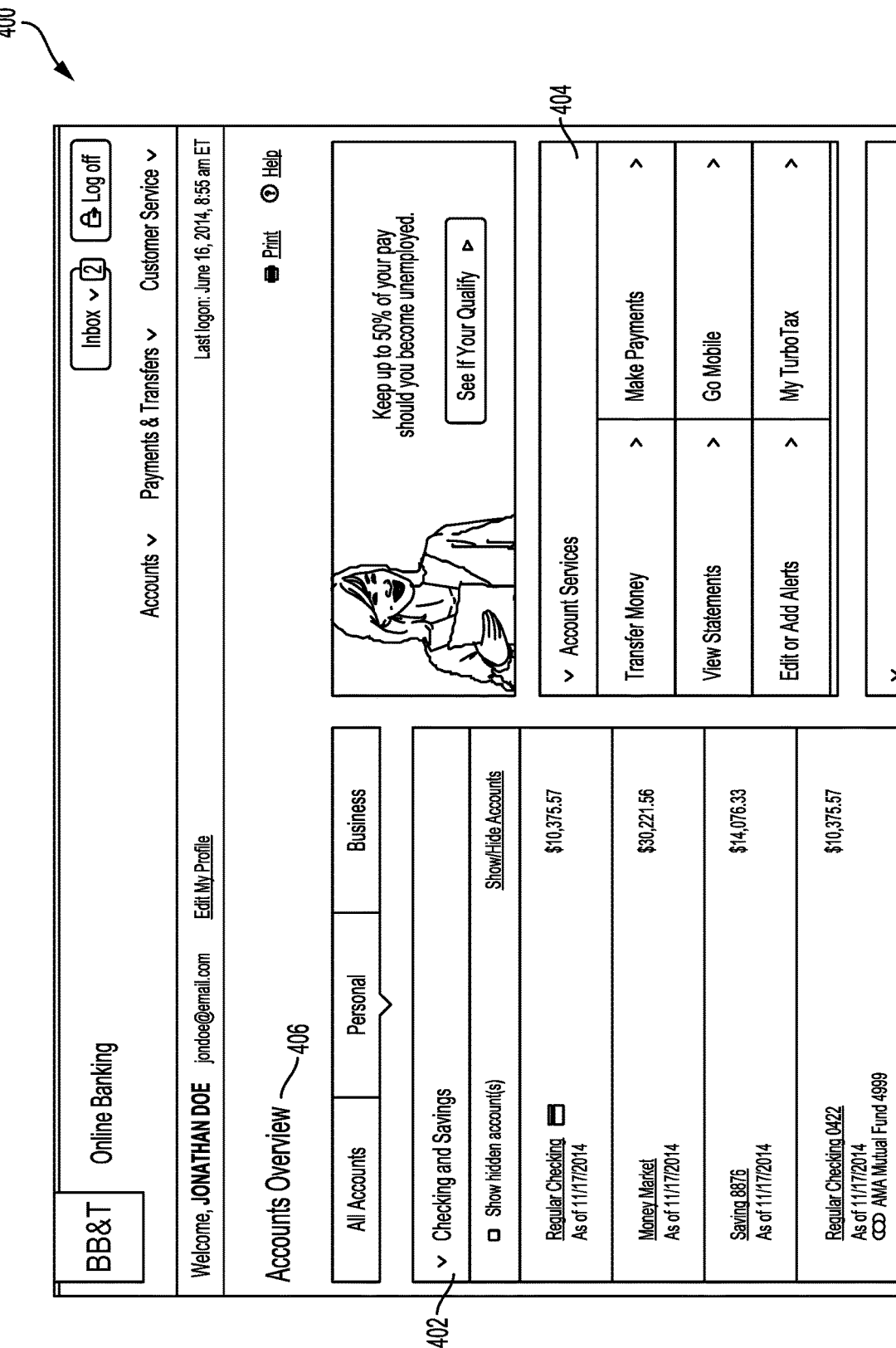
FIG. 4 is a user interface of an accounts overview according to one example.

FIG. 4 is a user interface 400 that may be the first page provided by the web server device 102 after the web server device 102 receives log in credentials from the user device 116. The user interface 400 a categorization of accounts by type, and provides the ability to switch among personal, business, or all accounts. Certain sections or options can be set closed or open. For example, selecting a heading such as "Checking and Savings" 402 or "Account Services" 404 can cause it to open or close. The settings may persist for the next time that the user logs in. Display of scheduled transfers and payments on Overview page 406 can be provided. Improved navigation through the Account Services section can be provided with touch friendly layouts—the larger "buttons" and increased white space can provide a better experience on touch devices such as "smart" phones and tablets.

Figure 5:
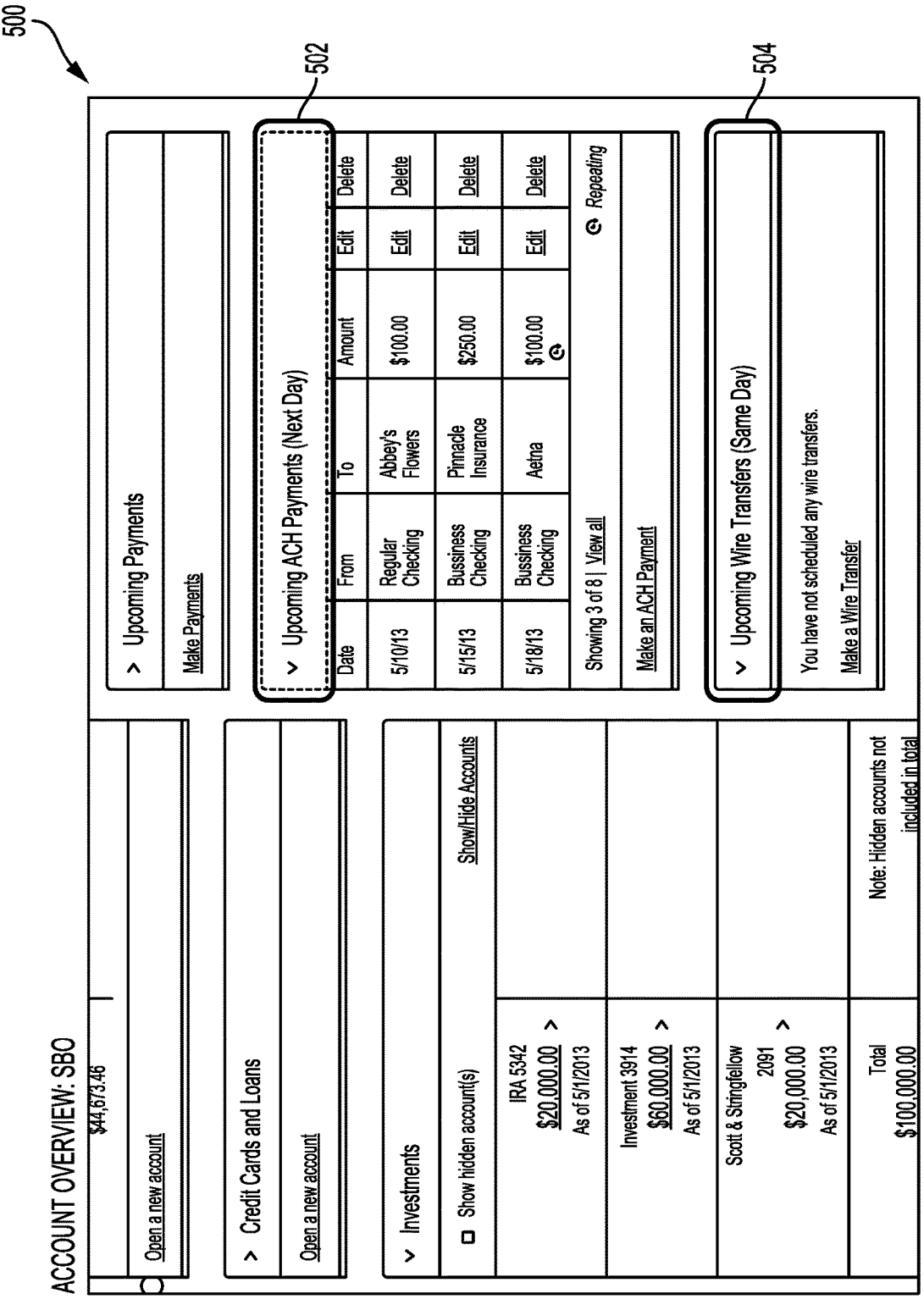
FIG. 5 is a user interface of an accounts overview according to another example.

FIG. 5 is an example of a user interface 500 for an account overview for a small business. The web server device 102 can provide the user interface 500 for display by the user device 116. This view includes a section for scheduled ACH 502 and Wire Transfers 504.

FIG. 6 is an example of a user interface 600 for providing account details in which "Posted" 602 and "Pending" 604 transactions are in a single table, and the interface includes a touch-friendly design. The web server device 102 can provide the user interface 600 for display by the user device 116. In addition, routing number and account number on the page can be masked for security.

The system 100 may provide at least two ways for users to pay bills within an online banking system: single view and list view. Each view can serve a particular user preference for paying bills.

Single view can display a "form" layout that matches the look and feel of transferring money. The interface can allow the user to select the individual person or business to pay (or use the type-ahead to narrow the options). While multiple payments can be added and then submitted at once using the single view flow, it can benefit users that pay one bill at a time. The single view may be a default view that provides an optimized layout for users on mobile devices with small screens.

FIG. 7 is an example of a user interface 700 for allowing a user to initiate payments or transfers. The web server device 102 can provide the user interface 700 for display by the user device 116. Separate transfer and bill pay functions can be combined into one section. In-line assistance provides information about fees, cutoff times, definitions, and account specific messages. Upcoming payments 702 (with totals per account) can be displayed. Depending on the selection by the user, the user interface 700 can be modified to guide the user in providing the information needed to initiate an action, such as a payment or a transfer.

Figure 8:
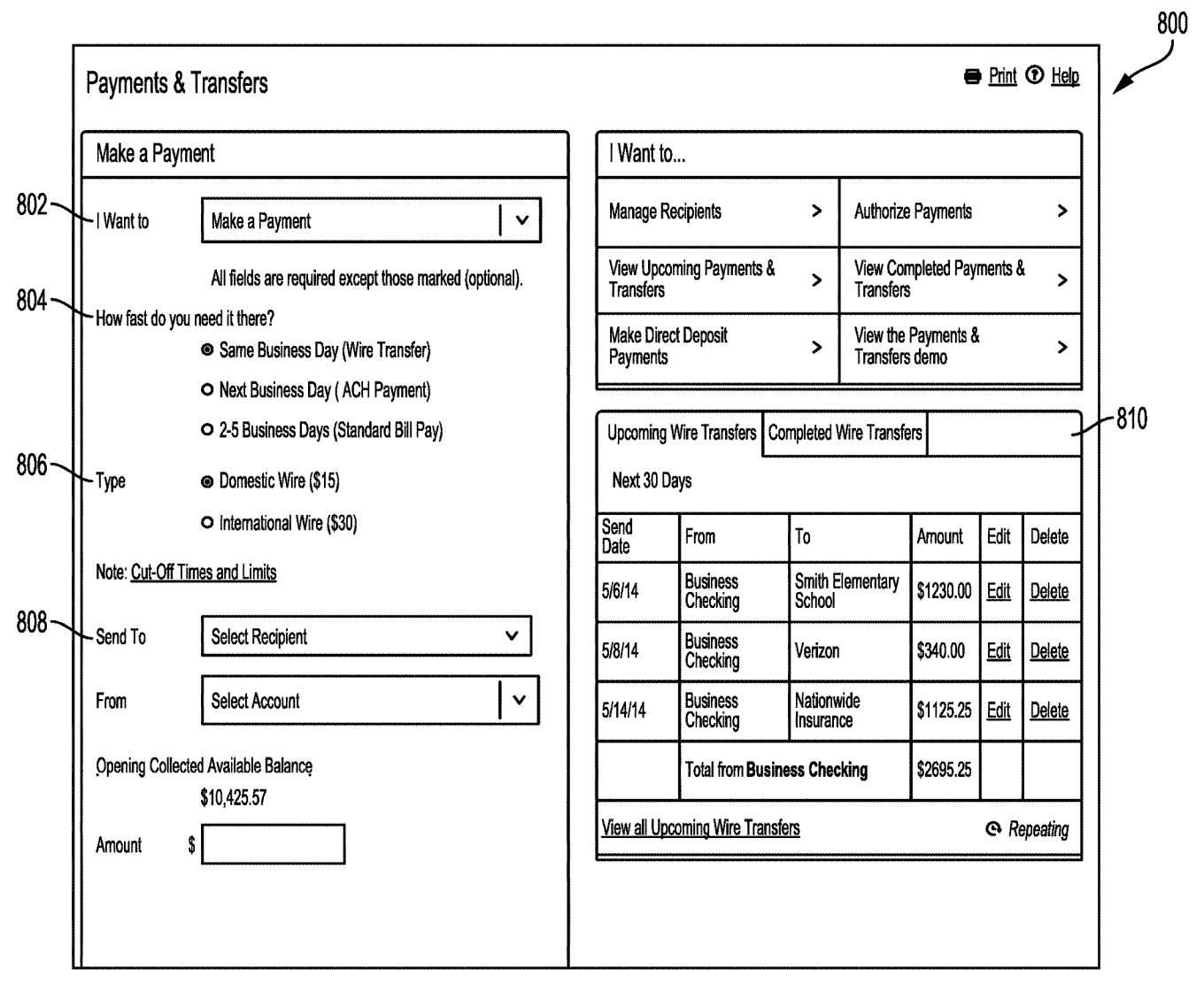

For example, FIG. 8 is an example of part of a user interface 800 that guides a user to enter information necessary to make a payment, but prevents the user from needing to enter information that is not needed for making a payment. The web server device 102 can provide information to the user device 116 for displaying the user interface 800. Subsequent to the user select that the user wants to "Make a Payment" 802, the user interface 800 elicits when the user needs the payment to be executed 804 (and may hide or make unselectable options that are not available for the user, for example depending on the time of day or the type 806 of payment that the user wishes to make. Recipient selection 808 can be populated with frequency or historical recipients selected by the user. Clearer language can define Wires, ACH and Bill Pay in terms of delivery times. In-line help defines cut off times, and other terms in-line. Upcoming and completed payment and transfers 810 are shown on the page. The upcoming and completed payments and transfers 810 can be displayed based on the type of selected payment or transfer. A user can also make direct deposit payments (if enrolled) from this flow. Opportunities for introduction to a payment service can be provided for users not enrolled in the program.

FIG. 9 depicts an example of part of a user interface 900 in which an electronic payment is being scheduled. Information about an electronic payment 902 can be accessible in-line for guiding a user in connection with bill pay. FIG. 10 depicts an example of part of a user interface 1000 in which an electronic payment is being scheduled. Information about a paper check 1002 can be accessible in-line for guiding a user in connection with bill pay. The web server device 102 can provide information to the user device 116 for displaying the user interfaces 900, 1000.

Figure 11:
FIG. 11 is a user interface with a selectable calendar for scheduling an action, according to one example.

FIG. 11 depicts an example of part of a user interface 1100 with calendar that may be displayed in-line with the user interfaces in the previous figures. The calendar can be used for selecting a "Send On" date in connection with a bill pay.

An alternate bill payment method is list view. List view can display the user's payees in a list format. A payment amount entry is provided for each person or business to pay; all other details for each payee are optional or display a default value that can be edited. The list view can provide a quick way to make multiple payments at once. It may also allow users to see all payees at once with last payment details, allowing the user to scan the list to see who has already been paid, how much they were paid, and when they were paid.

Figure 12B:
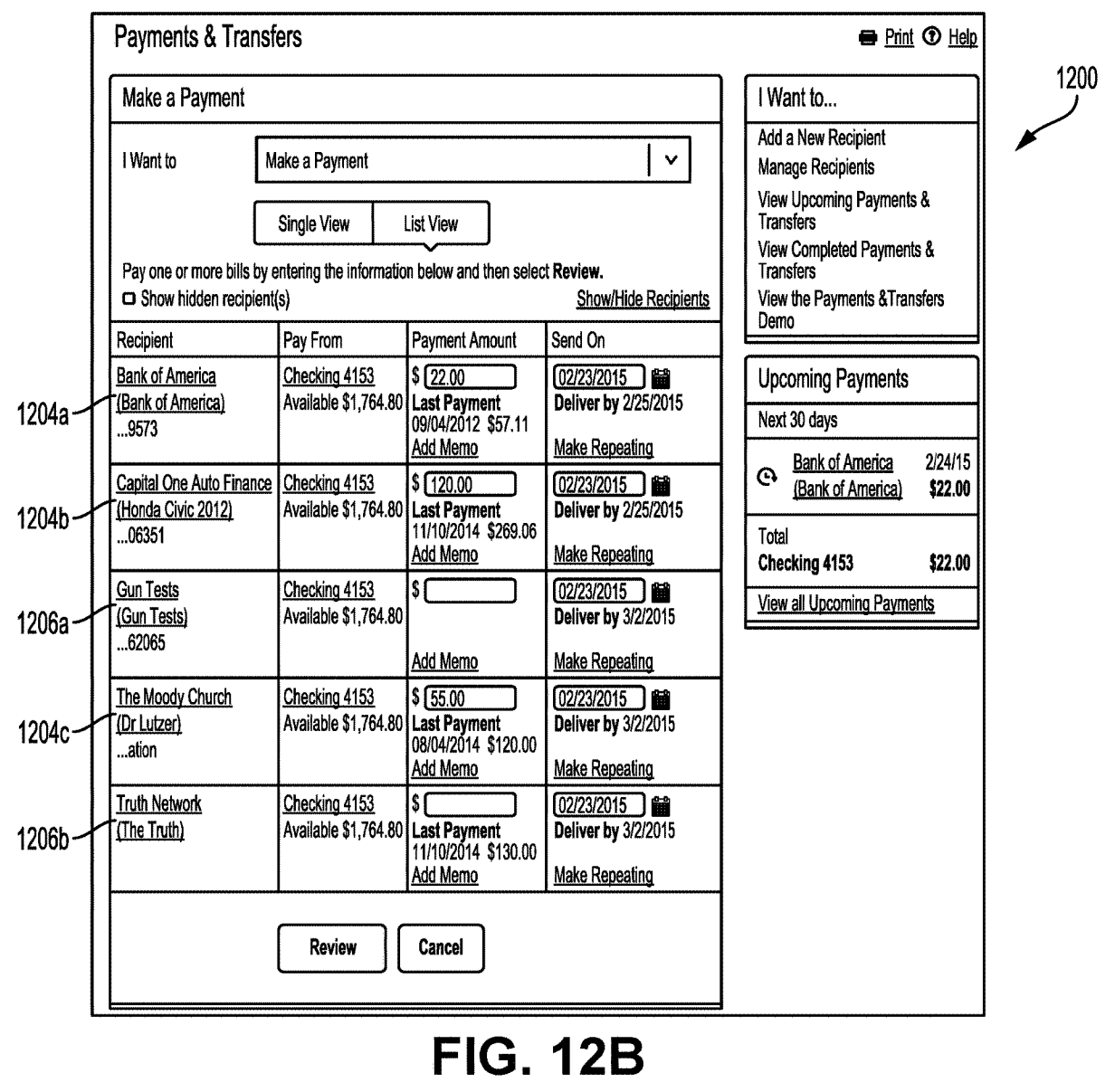

FIGS. 12A-14 are examples of user interfaces for a list view by which an action of bill pay can be initiated. FIG. 12A depicts a user interface 1200 that includes a list of payees for payment. Upcoming payments 1202 (with totals per account) are displayed as a reference for the user when making payments. FIG. 12B depicts the user interface 1200 with rows 1204a, 1204b, 1204c having a payment amount highlighted and rows 1206a, 1206b without an associated payment amount not highlighted. This can help a user maintain the user's place and quickly identify the payments that have been set up in the list. FIG. 13 depicts an example of a user interface 1300 for reviewing and verifying, for a list view, multiple payments prior to submission. FIG. 14 depicts an example of a user interface 1400 to provide confirmation that payments were scheduled. A success message 1402 can be displayed at the top of the page. The format can match the review page in FIG. 13 so that users are not disoriented. Payments can be edited or deleted. Totals can be provided from each funding account used. Suggested next steps 1404 can provide options for users. The web server device 102 can provide the user interfaces from FIGS. 12A-14 for display by the user device 116.

Systems according to some examples can include web server devices that can cause user interfaces to be configured differently, depending on the types of user devices showing the user interfaces—a responsive design. A responsive design can include "breakpoints" in the interfaces to better fit on a given device's screen. One code base can be used for many devices. Page elements can change depending on screen size. For example, a menu can go from tabs on the screen to a drop-down menu. In another example, elements, such as an account services box and banner ad, can be positioned vertically according to priority. The user interface can provide large fonts and large touch targets. The interface can scale and adapt to any screen size. Considerations for navigating on touch devices include allowing for mis-taps and providing for some controls, such as special menus, to be displayed only for mobile devices. FIGS. 15-18B depict examples of a responsive design user interface.

Figure 15:
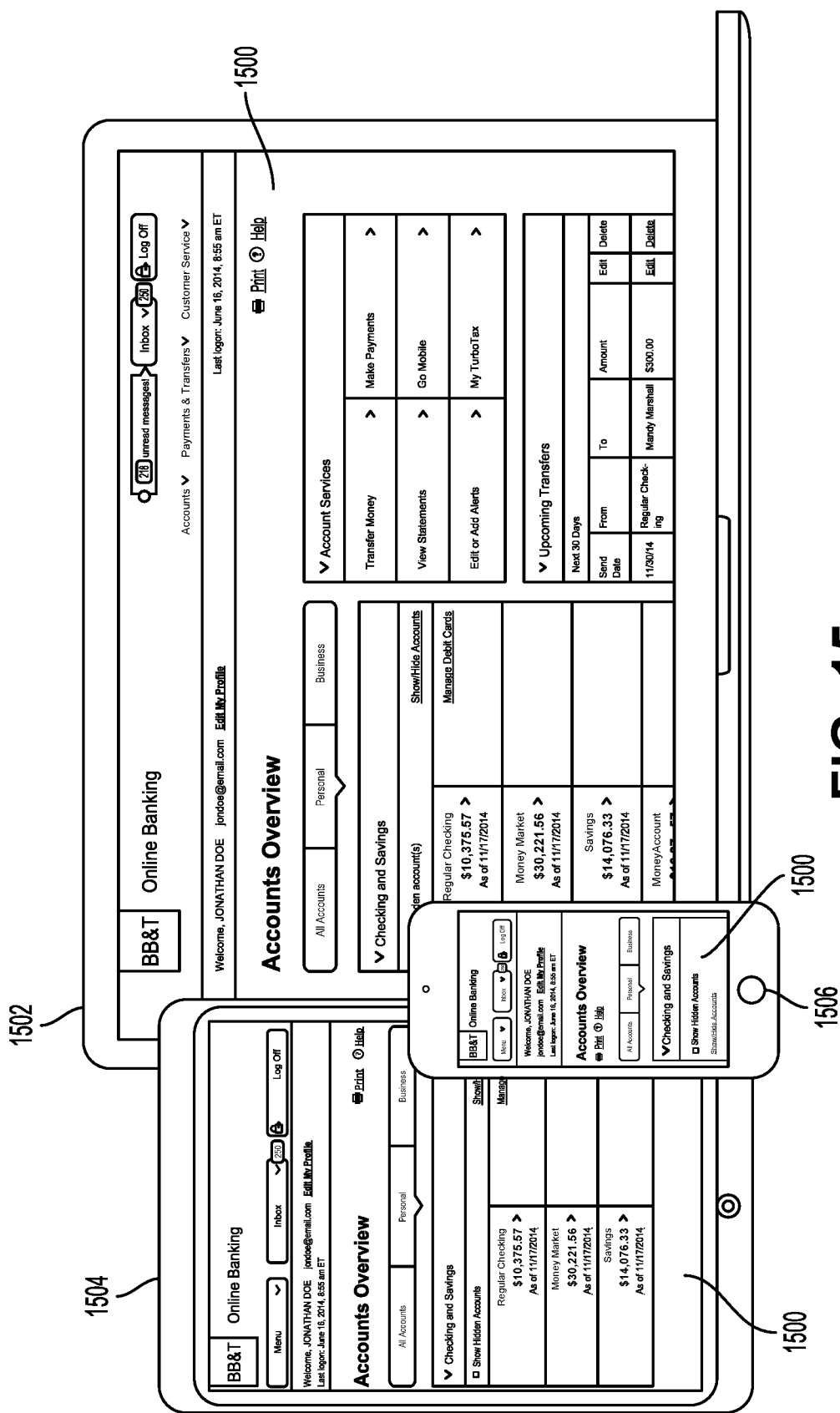
FIG. 15 is a user interface that is displayed in different formats on different user devices, according to one example.

FIG. 15 depicts examples of different appearances of a user interface 1500, depending on the device displaying the user interface 1500. The user interface 1500 is an online banking interface. The design and appearance of the user interface 1500 can change, depending on the size of the screen, to provide an optimal view experience. For example, the amount of content and the placement of content on the user interface can change, depending on the size of the device. In FIG. 15 there are three examples shown—the user interface 1500 on a laptop or desktop computing system 1502, the user interface 1500 on a tablet 1504, and the user interface 1500 on a mobile device 1506. In some examples, the same user interface 1500 can be served from the same website, as opposed to being served from a "mobile" site and a regular site, for the mobile device 1506 and the laptop or desktop computing system 1502, respectively.

FIG. 16 depicts an example of a user interface 1600 displayed on a laptop or a desktop. The appearance of the user interface 1600 may also be shown on a tablet in a landscape view. The user interface 1600 includes numbers 1 to 4 circled to identify certain features, which include: 1. main navigation displays with each top-level option shown, 2. payment form displayed on the left-hand side of the user interface 1600, 3. "I want to" options displayed at the top, right-hand side of the user interface 1600, and 4. upcoming and completed tables presented at the bottom, right-hand side of the user interface 1600.

Figure 17:
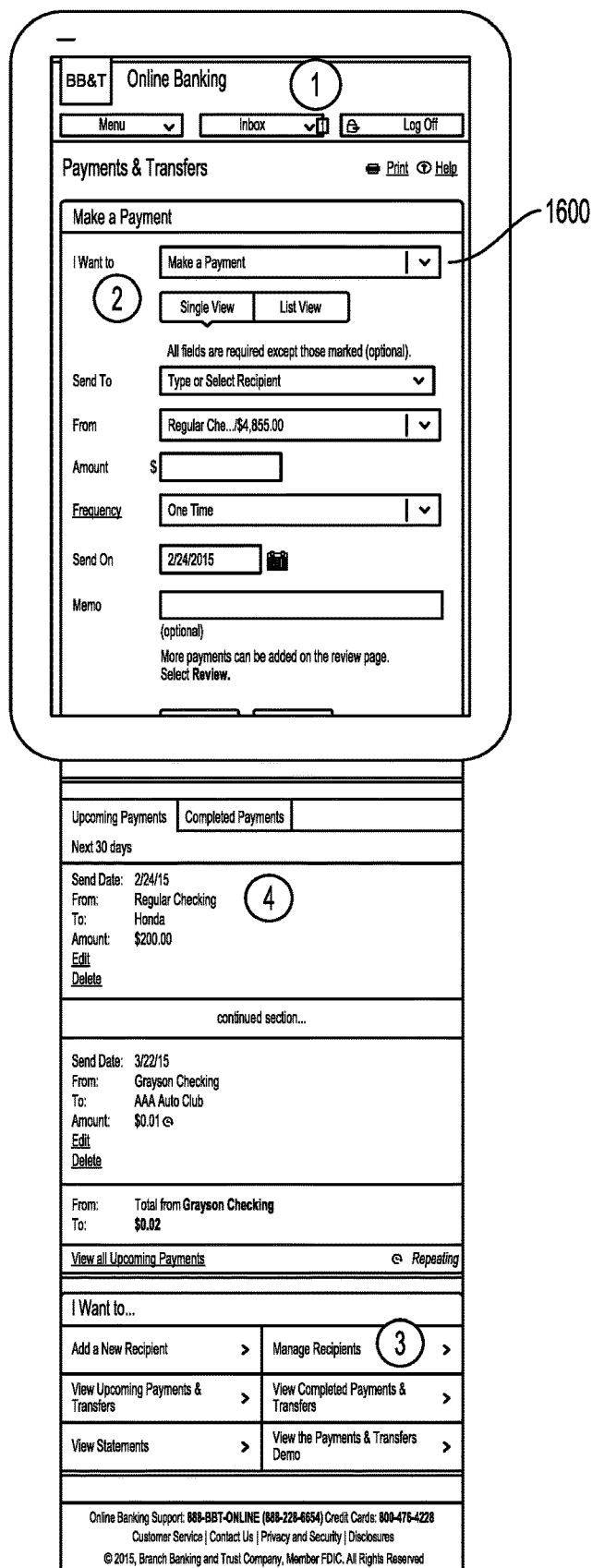
FIG. 17 is a user interface as displayed on a user device that is a second type of user device, according to one example.

FIG. 17 depicts an example of the user interface 1600 displayed on a tablet device or a mobile phone. In contrast to the user interface 1600 as shown in FIG. 16, the user interface 1600, again with reference to numbers 1 to 4 circled, shown in FIG. 17 includes: 1. a top navigation converted to compact menu options, 2. the payment form is the top, main function, 3. the "I want to" options drop to the bottom of the page and can be anchor links as the user scrolls to the bottom of the user interface 1600, and 4. upcoming and completed payments tables stack below the main form, and are converted to vertical lists on the user interface 1600.

Figure 18A:
FIG. 18A is a user interface as displayed on a user device that is a third type of user device, according to one example.
Figure 18B:
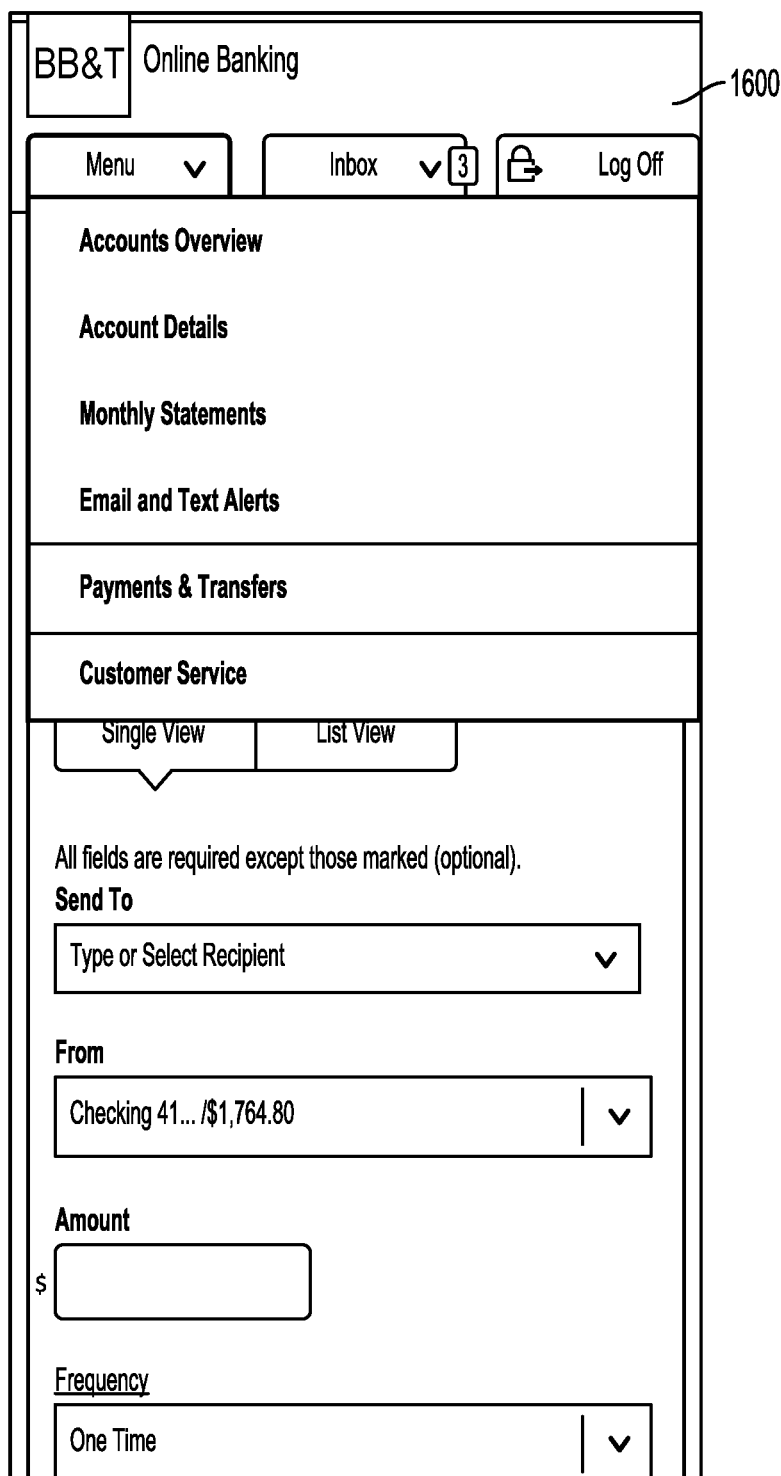
FIG. 18B is the user interface from FIG. 18A with a menu option selected, according to one example.

FIGS. 18A-18B depict an example of the user interface 1600 displayed on a mobile device, such as a mobile phone. The appearance of the user interface 1600 can be similar to the user interface 1600 as shown in FIG. 17, except that review and verify features may not be available. In some examples, these features can instead be accessible via links or via additional scrolling.

The foregoing description of the examples, including illustrated examples, of the subject matter has been presented only for the purpose of illustration and description and is not intended to be exhaustive or to limit the subject matter to the precise forms disclosed. Numerous modifications, adaptations, combinations, and uses thereof can be apparent to those skilled in the art without departing from the scope of the subject matter.

What is claimed is:

1. A web server device configured for communicating with a user device over a network via a web page, the web server device comprising:
a processing device; and
a non-transitory computer-readable medium comprising instructions that are executable by the processing device to cause the web server device to perform operations, the operations comprising:
receiving an indication from the user device;
determining an action indicated by the user device among multiple actions that include transfer money, bill payment, direct deposit, person-to-person payment, and wire transfer, wherein the web server device is configured for determining the action indicated by the user device among the multiple actions by identifying a type of action solely from an identification of a recipient received from the user device and using stored data that includes associations of types of actions with a plurality of recipients, the recipient being a person, an entity, or an account of another user other than a user of the user device; and
generating information for a user interface that is displayable by the user device for guiding the user via the web page to input information needed for the action determined from the multiple actions by (i)

preventing the user from entering information on the user interface that is unnecessary for executing the action but that is usable for executing other actions of the multiple actions that is different than the action determined from the multiple actions and (ii) retaining on the user interface requests for information that is necessary for executing the action.

2. The web server device of claim 1, wherein the web server device is positionable in a system, the system comprising:
database devices having different data associated with a user identification for the user and corresponding to different actions;
a backend application server system communicatively coupled between the web server device and the database devices and between the web server device and an action implementation system, the backend application server system being configured for communicating data between the web server device and the database devices and for commanding the action implementation system, which is an external system, to perform the action by:
selecting a database device from the database devices and a data type to access based on the action determined to be indicated by the user device, the action being a movement of money from or to the external system; and
validating information received from the user device and outputting a command to the external system to execute the action using the information that is validated, wherein the user interface includes:
a first element for the user to select an account from a list of accounts determined by the web server device to be available for the user, from which to move money;
a second element for the user to identify a recipient account to which to move the money, the recipient account being selectable from a list of available recipient accounts at least initially limited to recipient accounts previously selected by the user;
a third element for the user to identify an amount of money to move; and
a fourth element for the user to select a date on which to execute the action; and
an integration system configured for allowing the backend application server system to communicate with a person-to-person action system.

3. The web server device of claim 2, wherein the database devices comprise:
a first database device containing information about actions of a first type;
a second database device containing information about actions of a second type; and
a third database device containing user information.

4. The web server device of claim 2, wherein the user interface includes:
a fifth element for the user to select a payment or a transfer.

5. The web server device of claim 4, wherein the user interface further comprises:
a sixth element for the user to select among types of implementations for the payment or the transfer, depending on the action determined to be indicated;
a seventh element for listing upcoming payments and completed payments; and
an eighth element with a menu of options to view information and add additional recipient accounts to be displayed in the second element.

6. The web server device of claim 5, wherein the web server device is configured to rearrange, remove, or add selected elements, based on a type of user device with which the web server device communicates.

7. The web server device of claim 6, wherein the web server device is configured to provide modified versions of the same user interface to different types of user devices from a common web site.

8. The web server device of claim 7, wherein the different types of user devices include a mobile device and a laptop computing device.

9. The web server device of claim 1, wherein the identification of the recipient includes a type of recipient.

10. A method comprising:
receiving, by a web server device communicating with a user device over a network via a web page, an indication from the user device, the indication identifying a recipient;
determining, by the web server device or a backend application server system communicating with the web server device, an action indicated by the user device among multiple actions by automatically identifying a type of action solely from an identification of the recipient received from the user device and using stored data that includes associations of types of actions with a plurality of recipients, the recipient being a person, an entity, or an account of another user other than a user of the user device, the multiple actions including transfer money, bill payment, direct deposit, person-to-person payment, and wire transfer;
selecting, by the backend application server system communicatively coupled between the web server device and a plurality of database devices and between the web server device and an action implementation system, a database device among the plurality of database devices, and a data type to access, based on the action, the plurality of database devices having different data associated with a user identification for the user of the user device, and different data corresponding to different actions; and
generating, by the web server device, information for a user interface that is displayed by the user device for guiding the user via the web page to input information needed for the action determined from the multiple actions by (i) preventing the user from entering information on the user interface that is unnecessary for executing the action but that is usable for executing at least one other action of the multiple actions that is different than the action determined from the multiple actions and (ii) retaining on the user interface requests for information that is necessary for executing the action.

11. The method of claim 10, wherein the plurality of database devices comprise:
a first database device containing information about actions of a first type;
a second database device containing information about actions of a second type; and
a third database device containing user information.

12. The method of claim 10, wherein the user interface includes:
a first element for the user to select an account from a list of accounts determined by the web server device to be available for the user, from which to move money;
a second element for the user to identify a recipient account associated with the recipient to which to move the money, the recipient account being selectable from a list of available recipient accounts at least initially limited to recipient accounts previously selected by the user;

a third element for the user to identify an amount of money to move; and a fourth element for the user to select a date on which to execute the action.

13. The method of claim 12, wherein the user interface further comprises:

a fifth element for the user to select a payment or a transfer;

a sixth element for the user to select among types of implementations for the payment;

a seventh element for listing upcoming payments and completed payments; and an eighth element with a menu of options to view information and add additional recipient accounts to be displayed in the second element.

14. The method of claim 13, wherein the web server device rearranges, removes, or adds selected elements, based on a type of user device with which the web server device communicates.

15. The method of claim 14, wherein the web server device provides modified versions of the same user interface to different types of user devices from a common web site.

16. The method of claim 10, wherein the identification of the recipient includes a type of recipient.

17. A non-transitory computer-readable medium comprising instructions that are executable by a processing device for performing operations, the operations comprising:

receiving an indication from a user device;

determining an action indicated by the user device among multiple actions that include transfer money, bill payment, direct deposit, person-to-person payment, and wire transfer, wherein the operation of determining the action indicated by the user device among the multiple actions includes identifying a type of action solely from an identification of a recipient received from the user device and using stored data that includes associations of types of actions with a plurality of recipients, the recipient being a person, an entity, or an account of another user other than a user of the user device; and generating information for a user interface that is displayable by the user device for guiding the user via a web page to input information needed for the action determined from the multiple actions by (i) preventing the user from entering information on the user interface that is unnecessary for executing the action but that is usable for executing other actions of the multiple actions that is different than the action determined from the multiple actions and (ii) retaining on the user interface requests for information that is necessary for executing the action.

18. The non-transitory computer-readable medium of claim 17, wherein the user interface includes:

a first element for the user to select an account from a list of accounts determined to be available for the user, from which to move money;

a second element for the user to identify a recipient account associated with the recipient to which to move the money, the recipient account being selectable from a list of available recipient accounts at least initially limited to recipient accounts previously selected by the user;

a third element for the user to identify an amount of money to move; and a fourth element for the user to select a date on which to execute the action.

19. The non-transitory computer-readable medium of claim 18, wherein the user interface further comprises:

a fifth element for the user to select a payment or a transfer;

a sixth element for the user to select among types of implementations for the payment;

a seventh element for listing upcoming payments and completed payments; and an eighth element with a menu of options to view information and add additional recipient accounts to be displayed in the second element.

20. The non-transitory computer-readable medium of claim 17, wherein the identification of the recipient includes a type of recipient.

* * * * *